Figure 1:
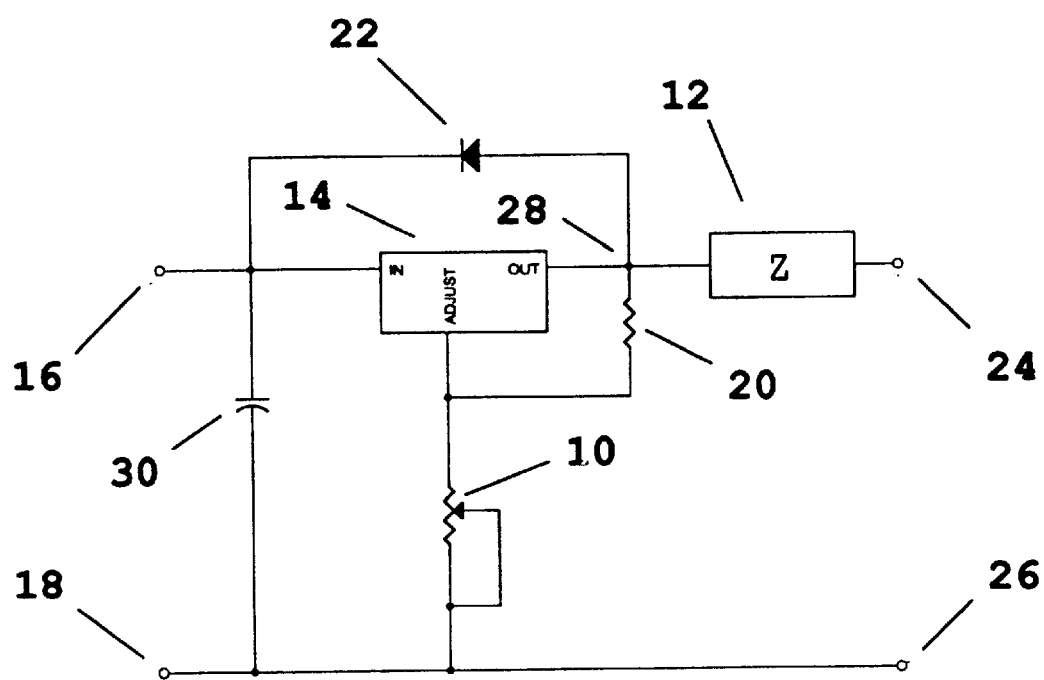

United States Patent [19]
Guthrie

[11] Patent Number: 6,081,100
[45] Date of Patent: Jun. 27, 2000

[54] METHOD FOR SIMULATING BEHAVIOR OF BATTERIES

[76] Inventor: Dennis Lynn Guthrie, 2404 Twin Creek Ct., Duluth, Ga. 30097

[21] Appl. No.: 09/315,673

[22] Filed: May 20, 1999

[51] Int. Cl.⁷ .................................................. H01M 10/46
[52] U.S. Cl. ............................................................ 320/135
[58] Field of Search .................................. 320/135, 134, 320/136, 142, 143; 323/275, 280

[56] References Cited

U.S. PATENT DOCUMENTS 4,878,009  10/1989  Esser .

OTHER PUBLICATIONS

Company: Rocket Vintage Guitar Equipment Product: Battman Power Supply and Battery Emulator Description: www.harmonycentral.com/newp/wnamm97/rocket/battman.html. Winter 1997.

*Primary Examiner*—Edward H. Tso

[57] ABSTRACT

A method for simulating the behavior of a battery utilizes a direct-current power supply with an adjustment for no-load output voltage (10) and an adjustment for source impedance (12).

1 Claim, 1 Drawing Sheet

METHOD FOR SIMULATING BEHAVIOR OF BATTERIES

CROSS-REFERENCE TO RELATED APPLICATIONS

Not applicable.

BACKGROUND

1. Field of Invention

This invention relates to the use of direct-current power sources with adjustable no-load voltages and adjustable internal impedances, specifically for use in special effects devices for musical instruments.

2. Description of Prior Art

Musicians, particularly guitarists, often employ the use of special effects devices in the signal line between their instruments and the amplifying equipment. These devices are used to produce audio effects such as signal distortion, regenerative time delays, and signal doubling (often referred to as chorusing).

Many of the special effects devices are designed to use either batteries or AC-to-DC power supplies as power sources.

However, there is reluctance by many musicians to use any power source other than batteries. This is because they prefer the way batteries alter the sound output from some special effects as they begin to run down. As the voltage supplied to these special effect devices decreases, the tonal quality of the device tends to change in a way that is desirable to the musicians, this change not being achievable from a traditional AC-to-DC power supply.

Such change in tone is further accentuated in certain special effects devices that draw sudden bursts of current from the battery when the input signal increases suddenly, since the internal impedance of a battery increases as it runs down, thereby further decreasing the voltage during a surge in current demand.

The desire to achieve this tonal quality is strong enough among many musicians such that they spend time and money buying fresh batteries, intentionally discharging them to certain levels, then labeling and storing the batteries until they are to be used in performances.

The main problem with this approach is that, aside from the cost in time and money for preparing the batteries, the batteries only operate in the desired state of discharge for a period of time before they become totally unusable. This useful time is sometimes shorter than the duration of the performance, resulting in the need to change batteries during a performance.

Some manufacturers of AC-to-DC power supplies have attempted to remedy this problem by offering supplies with output voltage adjustments built-in. While this solves the problem of providing a voltage that can be set to a level that produces the desired tonal quality under normal signal conditions, it does not address the problem of simulating the voltage fluctuations of a real battery under sudden current demand conditions.

Described by Esser et al. (U.S. Pat. No. 4,878,009) is a power supply arrangement that provides for adjusting both the no-load voltage output and the internal impedance. However, that patent specifies the design for use as a testing apparatus. It does not consider the design for use as a power source other than to allow characterization of the load under undesirable power supply conditions. It treats internal impedance as an undesirable attribute of a power source, not as a beneficial attribute as in the case of its use in musical instrument special effects devices.

SUMMARY

According to the present invention, a method for simulating the behavior of a battery utilizes a direct-current power supply with adjustable no-load output voltage and adjustable internal impedance.

Objects and Advantages

Accordingly, several objects and advantages of my invention are:

(a) to provide a method whereby musicians can achieve the tonal quality and dynamics from special effects devices that are typically associated with the use of predischarged batteries;

(b) to provide output voltage and internal impedance adjustments that simulate predischarged batteries, thereby relieving musicians from the monetary and time expenditures involved in buying and predischarging batteries;

(c) to provide a method of simulating predischarged batteries that will not degrade during use.

Other objects, features and advantages of the invention will become apparent from a consideration of the drawings and ensuing description.

DRAWING FIGURES

FIG. 1 shows a voltage regulation stage of a direct-current power supply with adjustable series impedance circuit in the output and an adjustment for no-load output voltage.

Reference Numerals In Drawings

| | |
|---|---|
| 10 voltage adjustment potentiometer | 22 protection diode |
| 12 adjustable series impedance circuit | 24 output voltage terminal |
| 14 adjustable voltage regulator | 26 output common terminal |
| 16 input voltage terminal | 28 voltage regulator output |
| 18 input common terminal | 30 filter capacitor |
| 20 feedback resistor | |

DESCRIPTION

FIG. 1 shows a known voltage regulation stage of a direct-current power supply with adjustable series impedance circuit in the output and an adjustment for no-load output voltage.

The circuit shown comprises a voltage input terminal 16, a common input terminal 18, a filter capacitor 30, a voltage regulator 14, a regulator protection diode 22, a feedback resistor 20, a voltage adjustment potentiometer 10, an adjustable series impedance circuit 12, an output voltage terminal 24 and an output common terminal 26.

Impedance circuit 12 is typically a potentiometer, but may comprise any circuit that presents a variable impedance, whether real or complex, in series with regulator output 28 and output terminal 24.

Operation

A direct-current voltage is applied across terminals 16 and 18. Filter capacitor 30 provides local filtering of the input voltage. Voltage regulator 14 provides a regulated voltage at regulator output 28. The voltage at regulator output 28 is set by the fixed value of feedback resistor 20 and the setting of potentiometer 10.

An adjustable series impedance circuit 12 is located in the output voltage path between regulator output 28 and output voltage terminal 24.

Output voltage terminal 24 and output common terminal 26 provide connections to the load.

With no load attached, the output voltage is set to the desired level by adjusting potentiometer 10. The load is then connected and series impedance 12 is adjusted to yield the desired fluctuation of output voltage as a function of load current demand. Assuming series impedance 12 to be real, and the impedance of the load to be real, the voltage presented across terminals 24 and 26 varies approximately as follows:

$$V_{load} = V_{reg}(Z_{load}/(Z_{load} + Z_s))$$

Where:
$V_{load}$ is the voltage across terminals 24 and 26
$V_{reg}$ is the voltage at output 28
$Z_{load}$ is the load impedance
$Z_s$ is the impedance of series impedance 12

Protection diode 22 protects regulator 14 in the event that a voltage appears at regulator output 28 exceeding the voltage at terminal 16.

Thus the reader will see that the my method, as described above, provides a use for a normally undesirable power supply attribute in such a way as to be highly beneficial to users of musical effects devices. The method saves them time and money, and provides them with a way to achieve consistent behavior in the effects devices.

The drawing and the description pertaining thereto are only intended to illustrate the idea of my battery simulation method. While the above description contains many specificities, these should not be construed as limitations on the scope of the invention, but rather as an exemplification of one preferred embodiment thereof. There are many possible circuit configurations that can be employed to achieve the objectives of the current invention. For example, voltage adjustment potentiometer 10 can be replaced by a computer-controlled digital potentiometer, or other active circuit element. Also, the input voltage presented at terminals 16 and 18 can be from any direct-current source such as a battery.

Accordingly, the scope of the invention should be determined not by the embodiment(s) illustrated, but by the appended claims and their legal equivalents.

I claim:

1. A voltage source for delivering an electrical output and having a variable source voltage and a variable internal resistance comprising:

(A) regulating means for regulating said electrical output (B) means for varying the internal resistance of said voltage source such that the voltage to the load will vary inversely in relation to the load current (C) means for varying the source voltage of said voltage source to a value desired when no load is applied.

* * * * *